United States Patent
Suess et al.

(10) Patent No.: US 11,822,157 B2
(45) Date of Patent: Nov. 21, 2023

(54) ENERGY EFFICIENT, HIGH RESOLUTION LIGHT DETECTION AND RANGING IMAGING RECEIVER WITH LARGE FIELD-OF-VIEW

(71) Applicant: Amazon Technologies, Inc., Seattle, WA (US)

(72) Inventors: Ryan J. Suess, Seattle, WA (US); Joseph Andrew Summers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1205 days.

(21) Appl. No.: 16/383,258

(22) Filed: Apr. 12, 2019

(65) Prior Publication Data

US 2020/0326563 A1 Oct. 15, 2020

(51) Int. Cl.
*G01C 3/08* (2006.01)
*G02F 1/01* (2006.01)
*G02F 1/03* (2006.01)
*G01S 7/4912* (2020.01)
(Continued)

(52) U.S. Cl.
CPC .......... *G02F 1/0136* (2013.01); *G01S 7/4816* (2013.01); *G01S 7/499* (2013.01);
(Continued)

(58) Field of Classification Search
CPC .. G02F 1/0136; G02F 1/0311; G02F 2202/20; G01S 7/4816; G01S 7/4912; G01S 7/499; G01S 17/10; G01S 17/89
See application file for complete search history.

(56) References Cited

U.S. PATENT DOCUMENTS

| 4,085,576 A | 4/1978 | Deverin |
| 7,995,191 B1 | 8/2011 | Sandusky |

(Continued)

FOREIGN PATENT DOCUMENTS

| CN | 1648684 A | 8/2005 |
| EP | 0287359 A1 | 10/1988 |

(Continued)

OTHER PUBLICATIONS

UKIPO Search and Examination Report for Application No. GB2005203.1 dated Apr. 20, 2021.

(Continued)

*Primary Examiner* — Samantha K Nickerson
(74) *Attorney, Agent, or Firm* — Athorus, PLLC

(57) ABSTRACT

A light detection and ranging (LIDAR) system with a large field-of-view (FOV) and low operating power includes an intensity modulator, a controller, and one or more camera sensors. The intensity modulator includes a modulating cell that is configured to receive an optical signal and change a polarization state of the optical signal, in response to an electrical signal received from the controller. The modulating cell includes a material that (i) has at least one of a first order electro-optic effect and a second order electro-optic effect and (ii) has an amount of birefringence that is less than or equal to a predefined amount of birefringence. The camera sensor(s) are configured to measure an intensity of the optical signal and determine range information of an object based on the measured intensity.

21 Claims, 8 Drawing Sheets

(51) Int. Cl.
*G01S 7/481* (2006.01)
*G01S 17/10* (2020.01)
*G01S 17/89* (2020.01)
*G01S 7/499* (2006.01)

(52) U.S. Cl.
CPC ............ *G01S 7/4912* (2013.01); *G01S 17/10* (2013.01); *G01S 17/89* (2013.01); *G02F 1/0311* (2013.01); *G02F 2202/20* (2013.01)

(56) References Cited

U.S. PATENT DOCUMENTS

| | | | |
|---|---|---|---|
| 2003/0007232 | A1 | 1/2003 | Zhao |
| 2004/0109633 | A1* | 6/2004 | Pittman .................. G06N 10/00 385/16 |
| 2006/0067618 | A1 | 3/2006 | Hill |
| 2012/0293853 | A1 | 11/2012 | Yafuso |
| 2014/0268096 | A1 | 9/2014 | Lebow et al. |
| 2015/0070709 | A1 | 3/2015 | Porte et al. |
| 2017/0184977 | A1* | 6/2017 | Jak ........................ G03F 7/7085 |
| 2017/0269215 | A1* | 9/2017 | Hall ....................... G01S 7/4811 |
| 2018/0177401 | A1* | 6/2018 | Yang .................. G01N 21/6458 |
| 2018/0292535 | A1 | 10/2018 | Wildi et al. |
| 2019/0204628 | A1 | 7/2019 | Banks et al. |
| 2020/0221068 | A1* | 7/2020 | Schmidt .................. B60Q 1/04 |

FOREIGN PATENT DOCUMENTS

| | | |
|---|---|---|
| EP | 2653884 A1 | 10/2013 |
| EP | 2846186 A1 | 3/2015 |
| WO | 03034007 A1 | 4/2003 |

OTHER PUBLICATIONS

Peng Zhang, Xiaoping Du, Jiguang Zhao, Yishuo Song, and Hang Chen, "High resolution flash three-dimensional LIDAR systems based on polarization modulation," Applied Optics, vol. 56, Issue 13, pp. 3889-3894 (2017).

GPTO Office Action for Application No. 102020002236.7 dated Mar. 25, 2021.

Chen, F.S. et al.: Light Modulation and Beam Deflection with Potassium Tantalate-Niabate Crystals; Journal of Applied Physics 37, 388 (1966); https:lldoi.org/1 0.106311.1707846 Submitted: Jun. 18, 1965 . Published Online: Jun. 17, 2004.

Bain, Ashim Kumar: Crystal Optics—Properties and Applications; Wiley-VCH Verlag, Weinheim, Deutschland, 2019; ISBN 978-3-527-41385-0.

United Kingdom Combined Search and Examination Report for Application No. GB2005203.1 dated Oct. 1, 2020.

S. Jo, H.J. Kong, H. Bang, J.-W. Kim, J. Kim, and S. Choi, "High resolution three-dimensional ash LIDAR system using a polarization modulating Pockels cell and a micro-polarizer CCD camera," Opt. Express 24, A1580-A1585 (2016).

Z. Chen, B. Liu, S. Wang, and E. Liu, "Polarization-modulated three-dimensional imaging using a large-aperture electro-optic modulator," Appl. Opt. 57, 7750-7757 (2018).

K. Moutzouris, G. Hloupis, I. Stavrakas, D. Triantis and M.-H. Chou, "Temperature-dependent visible to near-infrared optical properties of 8 mol% Mg-doped lithium tantalate," Opt. Mater. Express 1, 458-465 (2011).

M. R. Biazzo, "Fabrication of a Lithium Tantalate Temperature-Stabilized Optical Modulator," Appl. Opt. 10, 1016-1021 (1971).

GPTO Office Action for Application No. 102020002236.7 dated Mar. 22, 2021.

Intellectual Property Office, Patents Act 1977: Examination Report under Section 18(3) for Application GB2005203.1 dated Apr. 26, 2022.

S. Jo, H.J. Kong, H. Bang, J.-W. Kim, J. Kim, and S. Choi, "High resolution three-dimensional flash LIDAR system using a polarization modulating Pockels cell and a micro-polarizer CCD camera," Opt. Express 24, A1580-A1585 (2016).

* cited by examiner

ENERGY EFFICIENT, HIGH RESOLUTION LIGHT DETECTION AND RANGING IMAGING RECEIVER WITH LARGE FIELD-OF-VIEW

BACKGROUND

The present description relates to light detection and ranging (LIDAR) systems and, more specifically, to a LIDAR system that provides high angular resolution, large field-of-view, and low operating power.

LIDAR (also referred to as LiDAR and LADAR) is a technique that is often employed to obtain range or depth information about a target and generate three-dimensional (3D) images (or maps) of the target. For example, a LIDAR system typically measures distance to a target by illuminating the target with pulsed laser light and measuring the reflected pulses with a sensor. The reflected pulses are then used to generate 3D images. LIDAR systems are used in a variety of applications in which accurate range information about a target is needed. For example, using the data collected by a LIDAR system, it is possible to perform terrestrial mapping, target detection and recognition, obstacle detection and avoidance, etc.

Two conventional techniques that LIDAR systems typically employ to obtain 3D images include a scanning technique and a flash technique. The scanning technique uses one or a few detector pixels and a scanner to acquire 3D images. For example, in the scanning technique, multiple laser pulses are sent out from a laser system, and each laser pulse is directed to a different point on the target by a scanner. The time-of-flight (ToF) (of the reflected pulse) is then obtained for each target point, using a single detector pixel. The flash technique, in contrast, uses an array (e.g., two-dimensional (2D)) detector and a single laser pulse to illuminate the entire target and acquire 3D images.

BRIEF DESCRIPTION OF DRAWINGS

Various embodiments in accordance with the present disclosure will be described with reference to the drawings, where like designations denote like elements.

DETAILED DESCRIPTION

Figure 1:
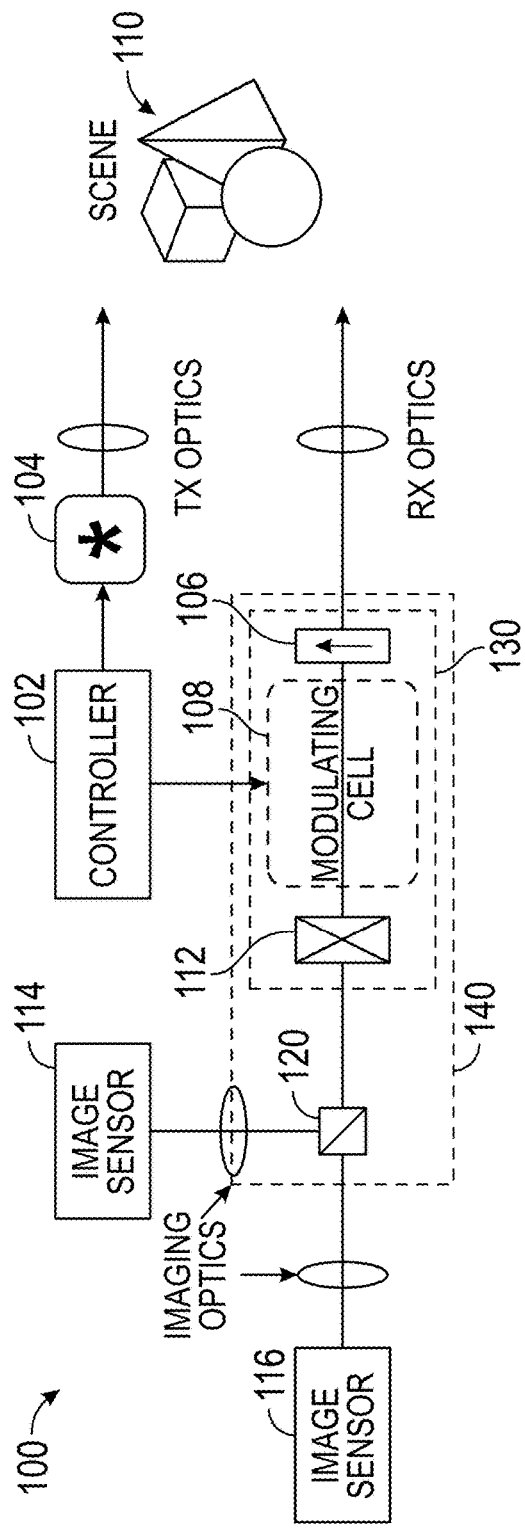
FIG. 1 is a block diagram illustrating a LIDAR system that uses an active material with minimal birefringence for a polarization-modulated receiver, according to one embodiment.

In a LIDAR system, a pulse (or sometimes modulated waveform) of light is emitted from an illumination source and subsequently scattered (e.g., reflected) by the scene or environment being interrogated. One or more techniques can then be used to determine the scene range information when the returned light is received by a detector. In one technique, for example, the scene range information can be determined by using one or more high-bandwidth, high-sensitivity element detectors (e.g., avalanche photodiodes) to directly record the time of photon arrival. In another technique (typically referred to as "time-of-flight" or ToF technique), customized image sensors are used to infer range information from a scattered optical waveform. For example, the ToF between when a light signal is emitted and its return to an image sensor is measured and the speed of light is used to determine the distance between the sensor and the objects in a scene.

In a LIDAR system according to one embodiment described herein, an optical intensity modulator is used to encode the range information from a scene. The optical intensity modulator includes an optical polarization modulator and an analyzing polarizer. The optical polarization modulator modulates the polarization of a beam passing through the electro-optical (or electro-optic) (EO) element of the optical polarization modulator. For example, in one embodiment, the optical polarization modulator includes a Pockels cell, a polarizer (e.g., linear polarizer), and a waveplate (e.g., quarter waveplate). The Pockels cell is an EO element that is used to switch (or change) the polarization direction (state) of a beam passing through the Pockels cell. The Pockels cell, in particular, operates according to the Pockels effect, which changes or produces birefringence in an optical medium induced by an electric field. In one embodiment, the LIDAR system collects scattered (e.g., reflected) light and encodes the range information onto the polarization state of the beam passing through the Pockels cell. For example, a light pulse can be emitted from the LIDAR system and scattered by an object or objects in a scene. Some of the scattered light is incident on the Pockels cell which then changes the polarization state of the collected light with respect to the time after the light pulse is emitted from the LIDAR system.

In one embodiment, the optical polarization modulator modulates the polarization of the beam by producing a rotation of the linear polarization angle of the beam. For example, when a voltage applied to the optical polarization modulator is zero, the linear polarization remains at the same angle. When the voltage is set to another value (e.g., $V_\pi$) the linear polarization angle is rotated by 90°. After exiting the optical polarization modulator, the polarization modulation is converted into an intensity modulation via the analyzing polarizer. For example, the analyzing polarizer modulates the intensity based on the amount of rotation of the linear polarization angle (produced) by the optical polarization modulator. An image sensor (e.g., charge-coupled device (CCD) camera, complementary metal-oxide-semiconductor (CMOS) camera, etc.) detects the light from the optical intensity modulator and the ToF is calculated from the recorded signal using knowledge of the modulator switching characteristic.

In conventional LIDAR systems that use the polarization technique, the Pockels cells are typically made from potassium dihydrogen phosphate (KDP) crystals or potassium dideuterium phosphate (KD*P) crystals, due in part to, e.g., having a large EO response and ability to handle high optical power density. However, one challenge associated with using KDP-based Pockels cells in a LIDAR system is that the KDP-based Pockels cells have a large optical birefringence (when inactive or when no field is applied), which introduces interference patterns, such as interference fringes, into the detected image. The interference patterns, in turn, significantly limit the usable FOV through the crystal to a few degrees, making KDP-based Pockels cells impractical for many LIDAR applications, including, for example, short range applications (e.g., within approximately 10 meters). Additionally, many KDP-based Pockels cells are typically not optimized to minimize power consumption, further limiting the range of uses and applications for these cells.

Embodiments presented herein describe a LIDAR system that can achieve a high FOV, relative to conventional LIDAR systems that are based on KDP-based cells. More specifically, embodiments can achieve a high FOV by using, for an EO modulating cell, an active material that (1) has a minimal level of birefringence (e.g., below a threshold amount of birefringence determined according to Equation (1)) or no amount of birefringence in the absence of an electric field applied to the material and (2) exhibits (or possesses) one or more first order EO effects, second order EO effects, higher order EO effects, or a combination thereof. In one embodiment, the minimal level of birefringence for the active material is determined based on a number of interference fringes that appear on a detector (or imaging screen) when the active material is illuminated. For example, the minimal level of birefringence may have a value such that, when the active material (e.g., crystal) is placed between two crossed polarizers, no interference fringes appear on the detector or imaging screen when the active material is illuminated with light containing the range of angles of interest for the LIDAR application. In this embodiment, the range of angles corresponds directly with the usable FOV of the LIDAR system.

Examples of EO materials that have the above properties (e.g., properties (1) and (2)) include, but are not limited to, lithium tantalate ($LiTaO_3$), potassium tantalate niobate ($KTa_xNb_{1-x}O_3$) or KTN, and lanthanum-modified lead zirconate titanate (PLZT, $Pb_{1-x}La_x(Zr_yTi_{1-y})_{1-x/4}O_3$). By using materials that possess the above properties for an EO modulating cell, embodiments can enable a LIDAR system (e.g., with such an electro-optic modulating cell) to have a large FOV, relative to a LIDAR system with KDP-based cells. The large FOV enables LIDAR systems to be used for a wider range of applications (e.g., compared to LIDAR systems with KDP-based cells), including short-range robotics, navigation, obstacle detection and avoidance, etc.

Additionally, as described in more detail below, embodiments provide an improved optical design for a LIDAR system that enables the LIDAR system to operate with low operating power, relative to conventional polarization-modulated LIDAR systems. As described in more detail below, the optical design includes at least one of: (1) using a digiscoping configuration to reduce the size of the active material in order to allow for a lower power consumption and (2) using a passive phase bias in the LIDAR system to increase the power efficiency. By using the optical design described herein along with an EO modulating cell that possesses the above properties, embodiments can enable a LIDAR system with a large FOV and low operating power, relative to conventional LIDAR systems based on polarization modulation.

Note that while some embodiments are described herein with reference to Pockels cells (e.g., modulating cells exhibiting the Pockels effect), such examples are provided for illustrative purposes only and without limitation. In other embodiments, the LIDAR system disclosed herein can use a modulating cell produced using the first order EO effect (Pockels effect), second order EO effect (Kerr effect, also referred to as the quadratic EO effect), or higher order EO effect. More generally, a modulating cell consistent with the functionality described herein can be made using an active material that possesses any one of (or combination of) these EO effects.

FIG. 1 is a block diagram illustrating a LIDAR system 100 that uses an active material with minimal birefringence (e.g., below a threshold amount of birefringence determined according to Equation (1)) for a polarization-modulated receiver, according to one embodiment. That is, the active material has an amount of birefringence (when no field is applied), such that, when the active material is placed between two crossed polarizers, no interference fringes appear on a detector or imaging screen when the active material is illuminated with light containing the range of angles of interest for the LIDAR application. In one embodiment, the LIDAR system 100 is implemented as a polarization-modulated flash LIDAR system. As shown, the LIDAR system 100 includes a controller 102, a laser source 104, an intensity modulator 140, and image sensors 114, 116. The intensity modulator 140 includes a polarization modulator 130 and a polarizing beam splitter 120 (e.g., analyzing polarizer). The controller 102 can include hardware components, software modules, or combinations thereof. In some embodiments, the controller 102 is representative of a variety of computing devices (or systems), including a laptop computer, mobile computer (e.g., a tablet or a smartphone), microcontroller or other embedded system, server, etc.

The controller 102 is configured to control operation of the laser source 104. In one example, the controller 102 triggers the laser source 104 to transmit (or emit or output) a light pulse (e.g., laser pulse, light emitting diode (LED) pulse, etc.) to the scene (or target) 110. As used herein, a light pulse may also be referred to as an optical pulse, an optical signal, an optical waveform, etc. The scene 110 may include multiple different objects located at different distances to the LIDAR system 100. The controller 102 can generally configure the repetition rate, energy, and duration of the light pulse that is output from the laser source 104. In some embodiments, the light pulse that is output from the laser source 104 may pass through TX optics (e.g., lens, mirrors, diffusers, etc.) before reaching the scene 110. In one reference example, the TX optics can include a set of collimating lenses and an optical diffuser (e.g., rotating diffuser, holographic diffuser, etc.) to provide laser speckle reduction (e.g., reduce coherent artifacts from the light illumination). In some cases, the optical diffuser can be placed at the focal point of the collimating lenses. In some cases, the optical diffuser can be placed over the emitting elements (e.g., LED or vertical-cavity surface-emitting lasers (VCSEL) array). In addition to speckle reduction, the optical diffuser can be used to create an even light field when an array of emitting elements is used. In another reference example, assuming pulsed illumination from a LED is used for the LIDAR system 100, the TX optics may not include a diffusing element.

The light pulse output from the laser source 104 is directed to the scene 110 and reflected by one or more objects in the scene 110. The reflected (or backscattered) light pulse from the scene 110 is initially received at the polarization modulator 130. In one embodiment, the reflected light pulse from the scene 110 can pass through RX optics (e.g., lens, filters, etc.) before being received at the polarization modulator 130. As shown, the polarization modulator 130 includes a linear polarizer 106, a modulating cell 108 (e.g., Pockels cell), and a quarter waveplate 112. The linear polarizer 106 is generally used to reject unwanted polarized light from the reflected light pulse. For example, assuming the linear polarizer 106 is configured parallel to the emitted linear polarized light (of the light pulse), the linear polarizer 106 can filter out unwanted polarized light to output only linear polarized light parallel to the emitted linear polarized light.

When the reflected light pulse reaches the modulating cell 108, the reflected light pulse experiences a polarization-dependent phase retardation and a corresponding change in its polarization, based on a trigger from the controller 102. In some embodiments, the controller 102 may implement a delay pulse generator that triggers the modulating cell 108 at a certain delay time ($\tau$) (e.g., after triggering the laser source 104) to change the polarization state of the reflected light pulse. The controller 102 can trigger the modulating cell 108 to change the polarization state by applying a time varying voltage, V(t), to the modulating cell 108 during a modulating time, $T_m$. In some embodiments, the controller 102 can program the delay time, $\tau$, to allow for detecting light that is reflected at different times. For example, $\tau$ can be programmed, such that the modulating cell 108 is triggered in time intervals $[\tau_1, \tau_1+T_m]$, $[\rho_2, \rho_2+T_m]$, etc. As used herein, each time interval $[\tau_i, \tau_i+T_m]$ (where $0 \geq \tau_i \leq T_m$) may be referred to as a time gate. By programming the delay time, $\tau$, embodiments can allow for the scanning of multiple time gates.

Figure 2A:
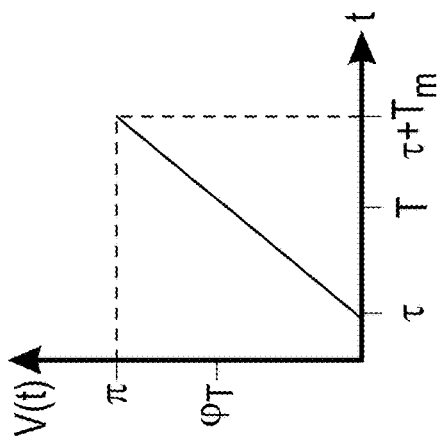
FIG. 2A is a graph of a voltage applied to a Pockels cell as function of time, according to one embodiment.
Figure 2B:
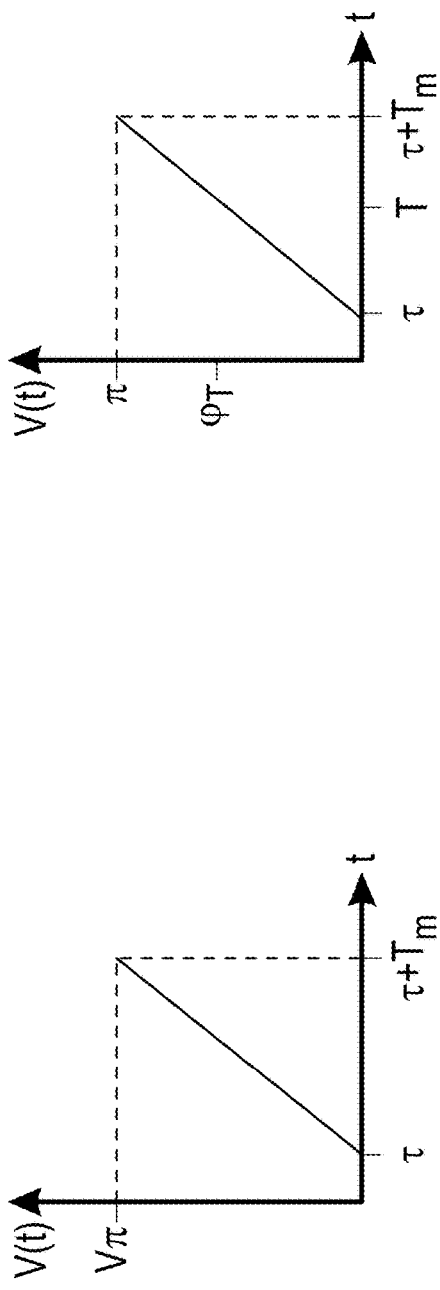
FIG. 2B is a graph of phase retardation of a light pulse as a function of time, according to one embodiment.

FIG. 2A illustrates a reference example of voltage applied to a Pockels cell as a function of time, according to one embodiment. As shown, when the controller 102 triggers the modulating cell 108, the voltage applied to the modulating cell 108 begins to increase from zero voltage to the half-wave voltage $V_\pi$ (where $V_\pi$ is the half-wave voltage of a modulating cell having a first order EO effect (also known as the Pockels effect)). Because the phase retardation $\varphi(t)$ is proportional to the applied voltage V(t), the applied voltage V(t) also triggers a change in the phase retardation $\varphi(t)$. Note, in other embodiments, the bias voltage can increase from zero voltage to another voltage (e.g., set below $V_\pi$). For example, a DC bias or passive phase bias can be applied with a voltage swing set below $V_\pi$ in order to operate within more of the linear central region of the intensity modulator transfer function. As shown in FIG. 2B, as the reflected light pulse from scene 110 travels through the modulating cell 108 during the modulation time T, the reflected light pulse experiences a polarization-dependent phase retardation $\varphi(t)$ and its polarization state is rotated by $\varphi_T$. In some embodiments, the ToF (e.g., T in FIG. 2B) of the reflected light pulse can be determined from the polarization rotation angle of the reflected light pulse.

Note that while FIGS. 2A and 2B depict the bias voltage and phase retardation for a Pockels cell, respectively, as increasing linearly with respect to time, in other embodiments, the bias voltage and phase retardation for a Pockels cell may have non-linear shapes (e.g., periodic or sinusoidal waveform). Additionally, for materials exhibiting second order EO effects (e.g., Kerr materials), the phase retardation may be proportional to the voltage squared, and for materials exhibiting higher order EO effects, the phase retardation may have higher order voltage dependence.

In one embodiment, the LIDAR system 100 can determine the range information based on the measured intensity of the reflected light pulse. In particular, as the polarization state of the light exiting the polarization modulator 130 changes in time, the range can be obtained from detected intensities after the analyzing polarizer (e.g., polarizing beam splitter 120) and knowledge of the switching characteristic of the modulating cell 108. In FIG. 1, for example, reflected light is linearly polarized using a linear polarizer 106 at the input of the modulating cell 108. Next, the EO component (e.g., Pockels component, Kerr component, or higher order EO component) of the modulating cell 108 rotates the linearly polarized light a certain degree(s) based on its ToF, converting it to an elliptical polarization. The quarter waveplate 112 converts the elliptical polarization into a linear polarization, and the polarizing beam splitter 120 splits the linearly polarized light between two different image sensors 114 and 116. In particular, a first polarized component (e.g., s-polarized light) is sent to (or detected by) the image sensor 114 and a second polarized component (e.g., p-polarized light) is sent to (or detected by) the image sensor 116. Note, however, that this is merely an example and that, in other embodiments, the LIDAR system 100 may include other types of analyzing polarizers that may behave differently. The image sensors 114, 116 measure the respective intensities of the polarized components, and use the intensity information to compute the range(s) between the LIDAR system 100 and the object(s) in scene 110. For example, the relative intensities of light at the image sensors 114 and 116 are used to extract the polarization angle.

As noted, in cases where a KDP-based Pockels cell is used as the modulating cell 108, the usable FOV for the LIDAR system can be limited to a few degrees, e.g., due to the large optical birefringence of KDP. This FOV limitation can make LIDAR impractical for certain short range applications (e.g., within 10 meters). In general, to have a large FOV through an active material, the material should have a minimal amount of birefringence or no amount of birefringence in the absence of an electric field being applied to the material. Additionally, the active material should exhibit at least one of a first order EO effect, second order EO effect, or higher order (e.g., third, fourth, and so on) EO effect.

Note that the LIDAR system 100 depicted in FIG. 1 is provided as a reference example of a LIDAR system 100 in which the techniques presented herein can be used to enable a large FOV and low operating power. In other embodiments, the techniques presented herein can be used in other LIDAR system configurations. In one particular embodiment, for example, the techniques presented herein can be used in a LIDAR system that uses a detector having a polarizer grid that is patterned directly onto the image sensor (e.g., micro polarizer array). In this embodiment, a single focal plane can be used and a polarizing beam splitter (e.g., polarizing beam splitter 120) is not required.

Accordingly, embodiments described herein use an active material that (1) has a minimal (or zero) amount of birefringence (e.g., below a threshold amount of birefringence determined according to Equation (1)) when no electric field is applied to the material and (2) possesses at least one of a first order EO effect (e.g., Pockels effect), second order EO effect (e.g., Kerr effect, also known as the quadratic EO effect), or higher order EO effect for the modulating cell 108. As noted, in embodiments described herein, the threshold amount of birefringence is an amount of birefringence, such that, when the active material is placed between two crossed polarizers, no interference fringes appear on a detector or imaging screen when the active material is illuminated with light containing the range of angles of interest for the LIDAR application. One example of the birefringence criteria that should be satisfied by an active material is described in more detail below with respect to FIG. 4. One example of a material that satisfies (1) and (2) is $LiTaO_3$, which exhibits the Pockels effect. Examples of Kerr materials that satisfy (1) and (2) include KTN and PLZT. KTN and PLZT, in particular, are Kerr materials that have zero intrinsic birefringence. By using these materials for EO modulating cells within a LIDAR system, embodiments can enable a LIDAR system that has a large FOV, relative to conventional LIDAR systems that use KDP-based cells.

Figure 3:
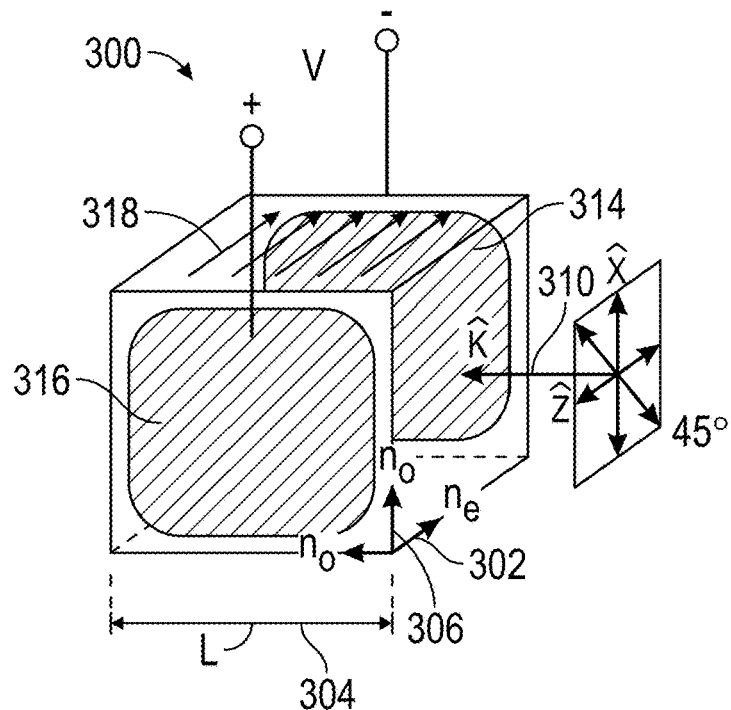
FIG. 3 depicts an example of a lithium tantalate-based Pockels cell, according to one embodiment.

FIG. 3 depicts an example of a $LiTaO_3$-based modulating cell 300 (e.g., Pockels cell) that can be used within a polarization modulator 130 of a LIDAR system 100, according to one embodiment. $LiTaO_3$ is a uniaxial crystal, which generally means that it has an extraordinary refractive index ($n_e$) along one of the principal axes of the crystal that differs from the ordinary refractive index ($n_o$) along the other two principal axes. Here, for example, the $LiTaO_3$-based modulating cell 300 has an extraordinary refractive index 302 along the z-axis ($\hat{z}$), and an ordinary refractive index 306 along the x and y axes ($\hat{x}$ and $\hat{y}$).

In one embodiment, the $LiTaO_3$ crystal can be used as a Pockels cell when the extraordinary axis of the $LiTaO_3$ crystal is oriented transverse to the direction of light propagation. As used herein, this orientation may be referred to as the y-cut orientation. In some cases, in addition to having the extraordinary axis of the $LiTaO_3$ crystal oriented transverse to the direction of light propagation, the incident light can be linearly polarized at 45° with respect to the extraordinary and ordinary axes, e.g., in order for the $LiTaO_3$ crystal to be used as a Pockels cell. As shown in FIG. 3, for example, the input optical signal 310 propagates in the $\hat{k}=\hat{y}$ direction, transverse to the extraordinary optical axis, and is linearly polarized at 45° between the ordinary and extraordinary axes (e.g., $\hat{x}$ and $\hat{z}$, respectively).

When the $LiTaO_3$ crystal is oriented in the manner depicted in FIG. 3, the light's electric field is allowed to couple equally to both ordinary and extraordinary axes of the material. As the light propagates along the length 304 of the $LiTaO_3$ crystal, the relative optical phase between the ordinary and extraordinary field components increases and can be controlled using an externally applied field along the extraordinary axis of the $LiTaO_3$ crystal. Here, for example, the $LiTaO_3$-based modulating cell 300 includes electrodes (or metallic plates) 314 and 316. When the electrical switching signal, V, is applied along the extraordinary axis via the electrodes 314 and 316, this results in the electrical field 318 along the $-\hat{z}$ direction. The applied voltage, V, modifies the active material by inducing a birefringence. The optical signal 310 interacts with the modified material, which produces the change in the polarization state of the light, allowing the $LiTaO_3$-based modulating cell 300 to function as an electrically controllable waveplate.

In one embodiment, the $LiTaO_3$-based modulating cell 300 can be used as the modulating cell 108 in FIG. 1. For example, the $LiTaO_3$-based modulating cell 300 can be placed between two orthogonally aligned polarizers (e.g., linear polarizer 106 and polarizing beam splitter 120), and a quarter waveplate (e.g., quarter waveplate 112) can be placed after the $LiTaO_3$-based modulating cell 300 (and before polarizing beam splitter 120) to form a polarization modulator 130. A polarizing beam splitter 120 can then be placed at the output of the polarization modulator 130 to form an intensity modulator 140. The polarizing beam splitter 120 is implemented as a polarization analyzer that converts the polarization state to an intensity, which is then measured by the detectors (e.g., image sensors 114, 116).

Note that while FIG. 3 depicts a $LiTaO_3$-based modulating cell, embodiments can use other active materials, such as Kerr-based materials, for the modulating cell 108. Compared $LiTaO_3$-based modulating cell, since the Kerr-based material (e.g., KTN) is isotropic when unbiased and above the Curie temperature, the Kerr-based material has no extraordinary axis (e.g., zero birefringence without bias) and may be used as a modulating cell without having a particular orientation. In embodiments with Kerr-based materials (or, in general, other EO materials that possess only even order electric susceptibilities), the input polarization of a light signal received by the modulating cell may be based on the geometry of the electrodes.

In one embodiment, a modulating cell 108 using the Kerr effect in KTN can be operated with the material in the cubic phase, which occurs when the crystal temperature is above the Curie temperature. The Curie temperature in this material can be adjusted by controlling the fraction of tantalum to niobium so that it is below the standard operating temperature of the element (e.g., for x=0.35, $T_{curie} \approx 0°$ C. for an operating temperature of 23° C.). In some cases, the crystal temperature can be stabilized by heating or cooling using a resistor or thermo-electric element. Further, in some embodiments, the power requirements for the cell can be adjusted by controlling the size of the crystal. Due to the temperature dependence of the EO effect, operating the cell near the Curie temperature can result in an enhanced effect and reduced power consumption of the device.

In general, the modulating cell 108 can be operated near the Curie temperature and/or the temperature can be controlled (e.g., engineered) to be near the operating temperature in order to achieve an enhanced effect and reduced power consumption of the device. For example, using KTN and PLZT as reference examples of Kerr materials, the variables x, y in $(KTa_xNb_{1-x}O_3)$ and $(Pb_{1-x}La_x(Zr_yTi_{1-y})_{1-x/4}O_3)$ can be modified to produce a material that is suited for the operating temperature. For example, based on the variables x, y, different compositions, dopings, etc., of the Kerr materials may be suitable for the modulating cell described herein. For KTN, in particular, adjusting x can be used to control the Curie temperature, e.g., in order to enhance the effect and reduce power consumption.

Figure 4:
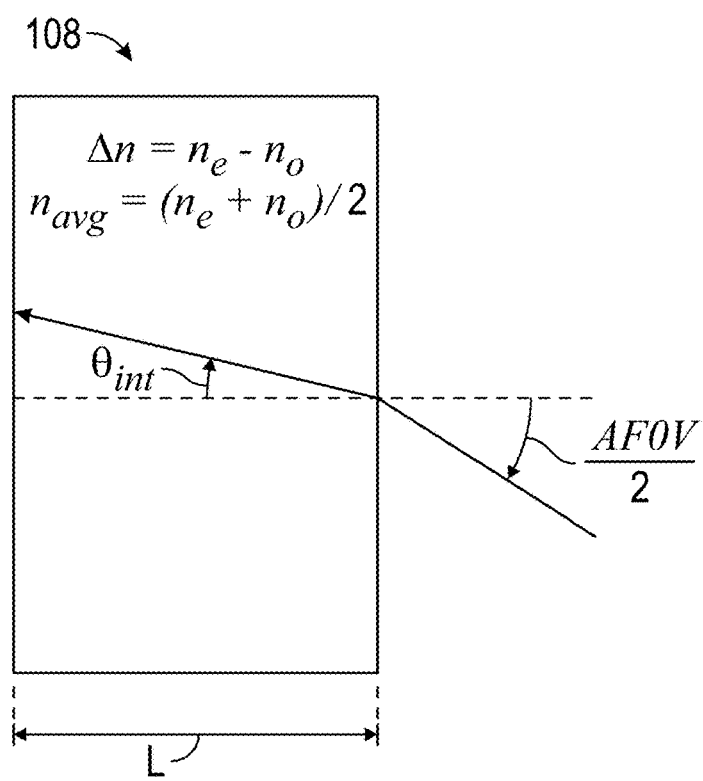
FIG. 4 depicts an example of the maximum angular field of view as a function of crystal length and birefringence of an active material, according to one embodiment.

FIG. 4 depicts an example of the maximum angular field of view (AFOV) (also referred to as FOV) as a function of crystal length, L, and birefringence, $\Delta n$, of the crystal, according to one embodiment. In some embodiments, the crystal properties depicted in FIG. 4 can be used to determine the birefringence condition (e.g., threshold birefringence level determined according to Equation (1)) that an active material should satisfy in order to be used as a modulating cell 108 within the LIDAR system 100 described herein. In one embodiment, given the maximum desired AFOV, an active material of length L should have a birefringence, Δn, that satisfies the following birefringence condition in Equation (1):

$$\theta_{int} < \cos^{-1}\left(\frac{1}{\frac{\lambda}{2L\Delta n}+1}\right) \quad (1)$$

where $$n_{avg}\sin\theta_{int} = \sin\frac{AFOV}{2} \text{ (e.g., Snell's Law)},$$

$\Delta n = n_e - n_o$, $n_{avg} = (n_e + n_o)/2$, $\theta_{int}$ is the angle of refraction, $n_e$ is the extraordinary refractive index of the material, and $n_o$ is the ordinary refractive index of the material.

Figure 5A:
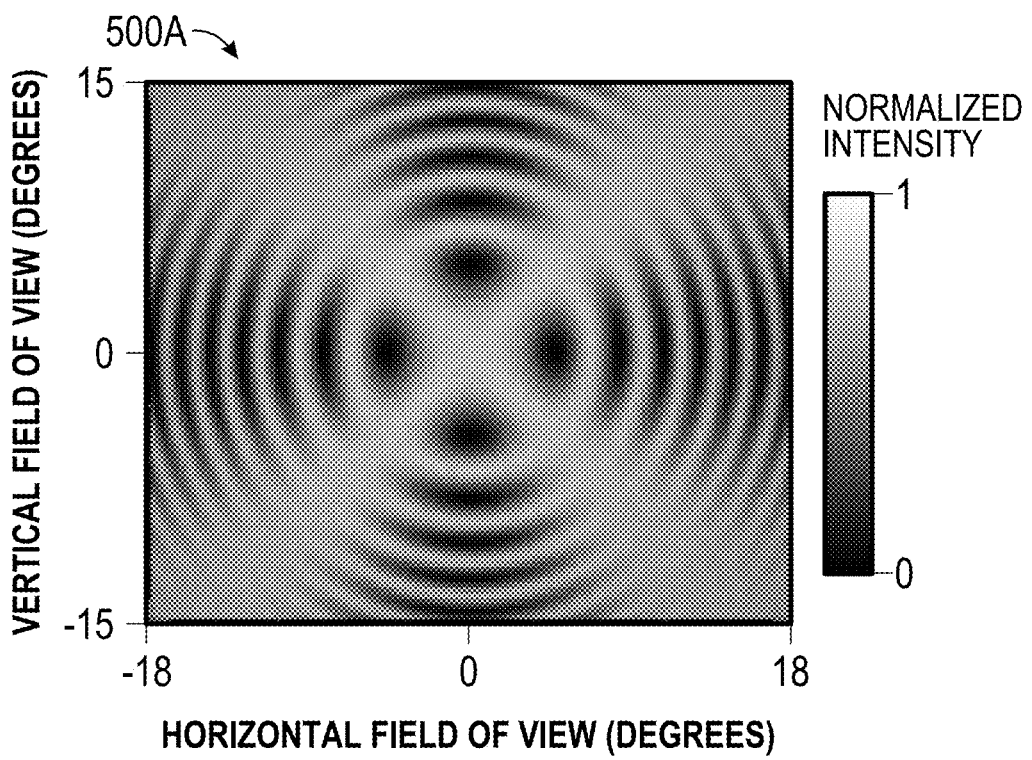
FIG. 5A depicts an example image detected by a LIDAR system that uses potassium dihydrogen phosphate-based cells, according to one embodiment.
Figure 5B:
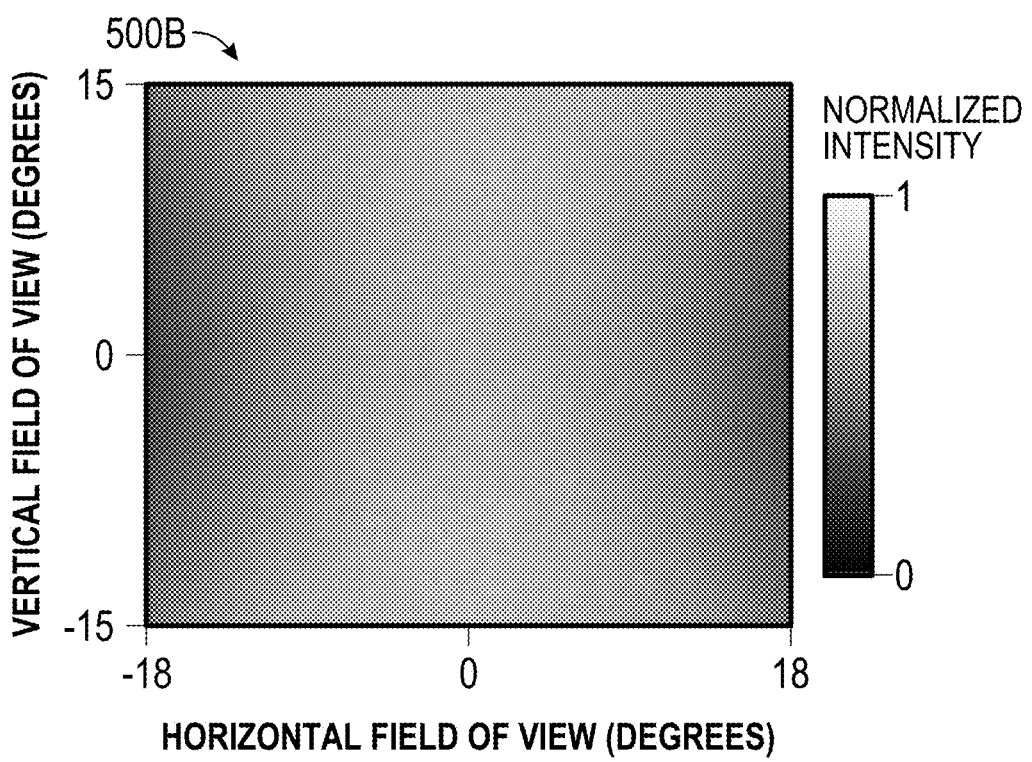
FIG. 5B depicts an example image detected by a LIDAR system that uses lithium tantalate-based cells, according to one embodiment.

As noted, LIDAR systems that use modulation cells based on materials, such as $LiTaO_3$, KTN, PLZT, etc., can provide a larger FOV compared to LIDAR systems that use KDP-based cells. FIGS. 5A and 5B show example received images 500A and 500B for KDP-based cells and $LiTaO_3$-based cells, respectively. An ideal image in this example would appear uniform and bright across the FOV. As shown in FIG. 5A, dark, ring-like patterns, which are interference fringes, appear in the image 500A and significantly reduce the depth image quality produced by the LIDAR system. These interference fringes are due to the large birefringence in KDP. On the other hand, as shown in FIG. 5B, no interference fringes are present in the image 500B, resulting in a larger usable FOV for the LIDAR system.

In some cases, the length of the active material (e.g., crystal) used for the modulating cell 108 may have an impact on the performance of the LIDAR system 100. For example, in general, the phase difference over the full length, L, of the unbiased crystal should be an integer multiple of 7C, such that the signal detected by the LIDAR system is either fully "on" or "off." In other words, the light should be fully passed or blocked when no voltage is applied. This condition is described in Equation (2) below:

$$L = \frac{m\lambda}{2|n_e - n_o|}, \quad (2)$$

where m is an integer, and $\lambda$ is the wavelength of the illumination used for ranging. In one reference example, assume $LiTaO_3$ is used for the crystal. In this example, at a wavelength $\lambda$=940 nm, the extraordinary and ordinary refractive indices of $LiTaO_3$ are $n_e$=2.146 and $n_o$=2.142, respectively. Based on these values (e.g., after substituting into Equation (2)), the $LiTaO_3$ crystal should be manufactured with a length equal to an integer multiple of 117.5 μm. In cases where the length of the $LiTaO_3$ crystal does not satisfy this condition, the switching performance of the LIDAR system can be impacted. For example, in some case, the switching performance can degrade (e.g., up to a factor of two) when the $LiTaO_3$ crystal is off from the optimal length (approximately 58.8 μm at the example wavelength of 940 nm). Such a high sensitivity to crystal length could make $LiTaO_3$ (and other EO materials) difficult and expensive to manufacture repeatedly at scale.

Embodiments described herein provide various modulating cell designs that can be used to compensate for the crystal length sensitivity. In one embodiment, the birefringence of a single crystal of $LiTaO_3$ can be compensated if a second crystal of equal length is placed in series with it. In this case, the second crystal can be rotated by 90°, such that the extraordinary axis of the second crystal is parallel to the ordinary axis of the first crystal. In this configuration, the total optical phase shift of light propagating through both crystals will ensure the dual-crystal cell is either fully "on" or "off" when unbiased.

Figure 6:
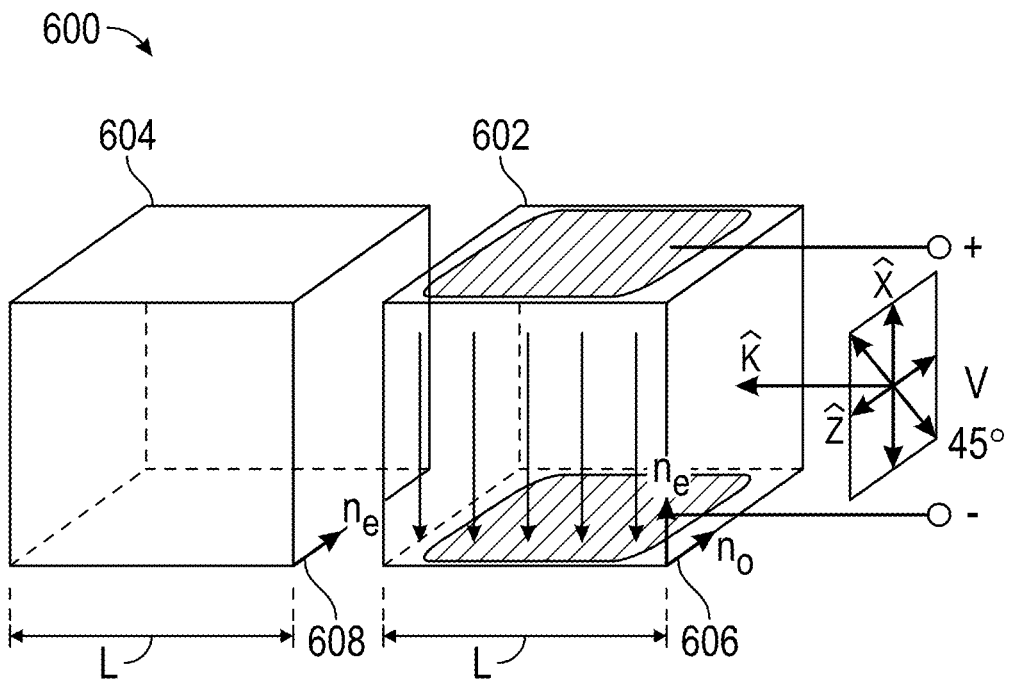
FIG. 6 depicts an example dual-crystal modulating cell design, according to one embodiment.

FIG. 6 depicts an example dual-crystal modulating cell design 600 that can be used to compensate for the sensitivity to crystal length, according to one embodiment. As shown, the modulating cell design 600 includes a first crystal 602 and a second crystal 604 in series. Here, the second crystal 604 is rotated 90° with respect to the first crystal 602, such that the extraordinary axis 608 of the second crystal 604 is parallel to the ordinary axis 606 of the first crystal 602. In the modulating cell design 600, the first crystal 602 and the second crystal 604 each have the same length L. As shown, the second crystal 604 has no electrodes and is electrically inactive. This design achieves birefringence compensation, resulting in a doubling of the total length of the Pockels cell. In another embodiment, a waveplate can be used instead of the second crystal 604, e.g., to compensate for the first crystal 602. For example, in this embodiment, the waveplate can be rotated until the light is fully on or off.

Figure 7:
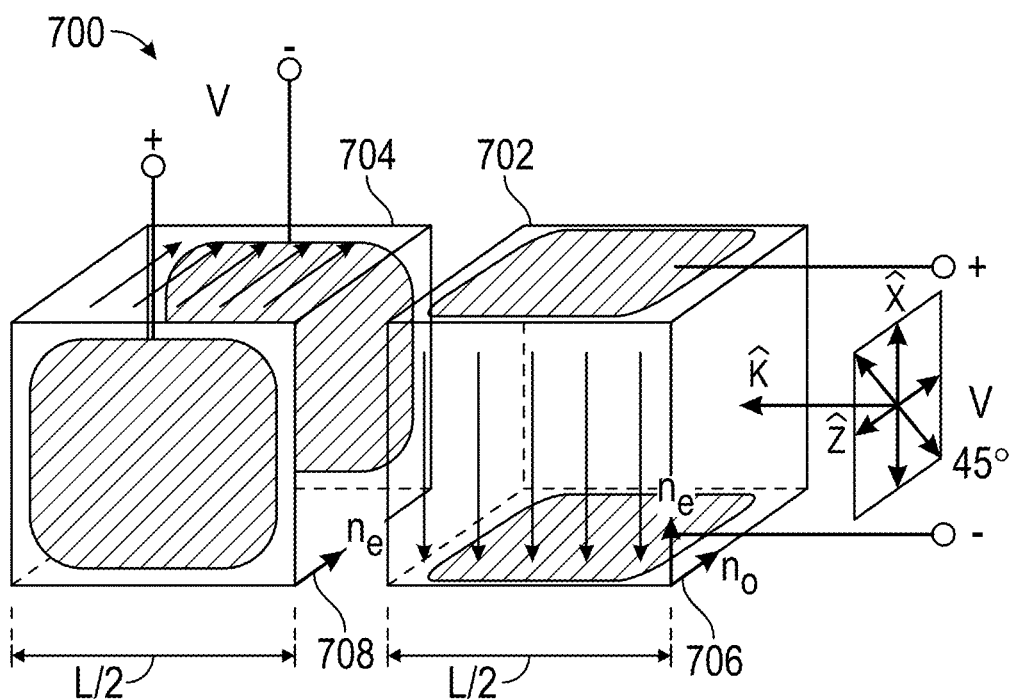
FIG. 7 depicts another example dual-crystal modulating cell design, according to one embodiment.

FIG. 7 depicts another example dual-crystal modulating cell design 700 that can be used to compensate for the sensitivity to crystal length, according to one embodiment. As shown, the modulating cell design 700 includes a first crystal 702 and a second crystal 704 in series, e.g., similar to the modulating cell design 600. Further similar to the modulating cell design 600, the second crystal 704 is rotated 90° with respect to the first crystal 702, such that the extraordinary axis 708 of the second crystal 704 is parallel to the ordinary axis 706 of the first crystal 702. In contrast to the modulating cell design 600, the second crystal 704 is biased at the same voltage as the first crystal 702, but at an opposite polarity to the first crystal 702. As shown, in the modulating cell design 700, the total crystal length remains unchanged from the uncompensated design (e.g., depicted in FIG. 3), as each of the first and second crystals 702, 704 has a length L=L/2.

In some embodiments, obtaining two crystals of the same length (e.g., for the modulating cell design 600 and the modulating cell design 700) can be achieved by cutting both crystals from a larger single piece of cut and polished crystal (such as a wafer). In some embodiments, obtaining two crystals of the same length can be achieved by measuring and binning crystals by length when produced in volume, so that they can be paired during assembly.

As noted above, embodiments described herein also provide a modulating cell design that can reduce the operating power of LIDAR system, relative to conventional LIDAR systems based on polarization modulation. In some embodiments, the geometry of the EO crystal in the Pockels cell can be modified in order to reduce the operating power of the LIDAR system and/or reduce other system parameters (e.g., cost). In general, the average power for driving the Pockels cell during an operation, $P_{cell}$, is proportional to the energy needed to charge the capacitor formed by electrical contacts to the cell and the crystal itself. That is, $P_{cell} \propto CV^2$, where C is the capacitance of the cell and V is the applied voltage to the cell. In some cases, both the capacitance and the drive voltage required for full switching can be expanded in terms of constituent geometrical and material parameters. Doing so, for example, leads to an expression for the average power consumption that is in proportion to the cell aperture, A, divided by cell length, L $$\left(\text{e.g., } P_{cell} \propto \frac{A}{L}\right).$$

Accordingly, embodiments described herein can reduce the size of the crystal aperture for a given cell to reduce the power consumption of the modulator.

Figure 8:
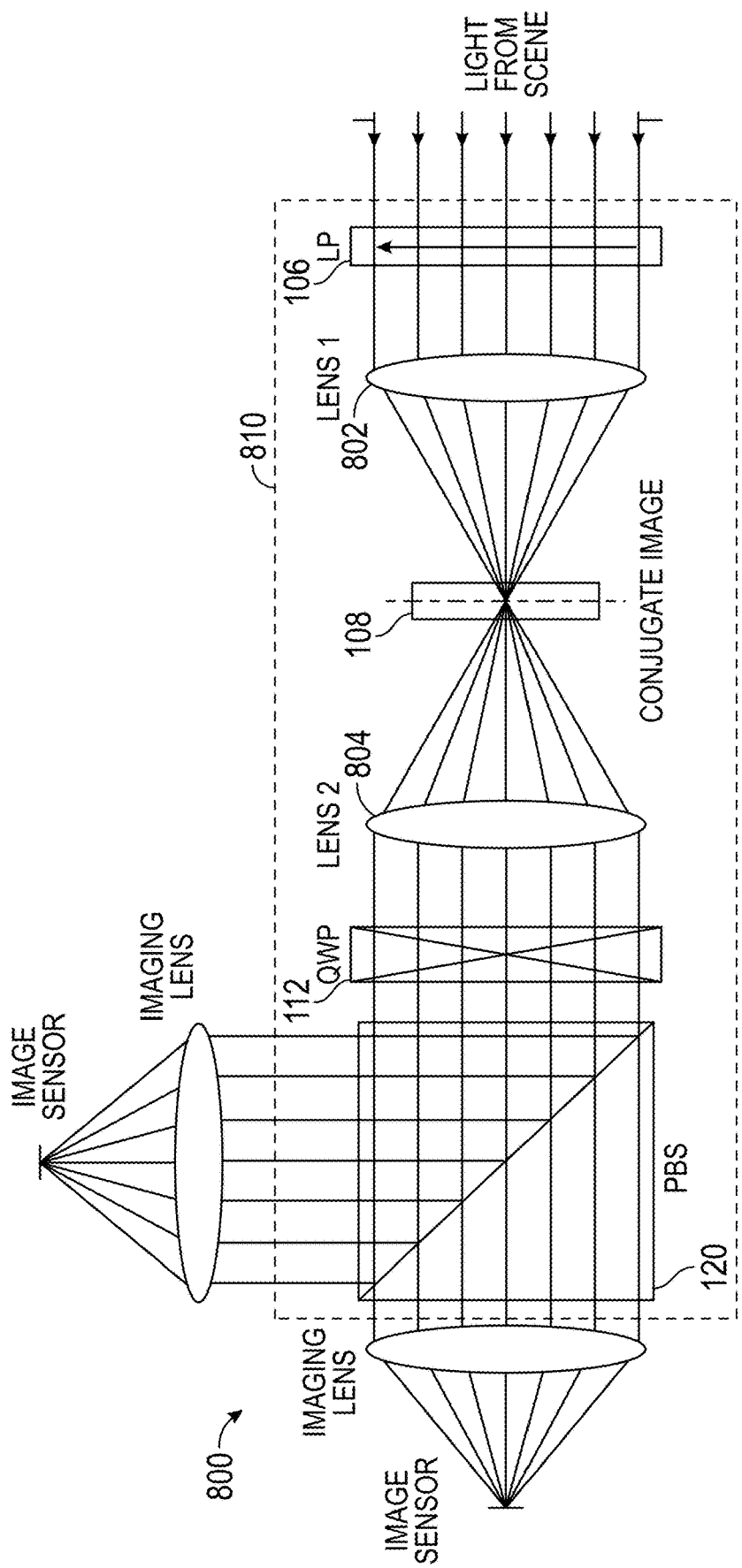
FIG. 8 is a diagram illustrating an example configuration for reducing power consumption of a LIDAR system, according to one embodiment.

FIG. 8 is a diagram illustrating an example digiscoping configuration 800 for reducing power consumption of a LIDAR system, according to one embodiment. The digiscoping configuration 800 includes an intensity modulator 810, in which the modulating cell 108 is placed in a conjugate image plane of the optical train to allow for a smaller crystal and lower electrical power consumption. In particular, compared to the intensity modulator 140, the intensity modulator 810 includes two lenses (lens 802 and lens 804) that are placed on opposite sides of the modulating cell 108, at a distance close to or at the focal length of the lenses 802 and 804.

At this separation, a conjugate image is formed in the modulating cell 108 that is limited in lateral extent by the power of the lens and the desired angular field of view, as approximated by Equation (3):

$$\sqrt{A} = 2f \tan\left(\frac{AFOV}{2}\right), \quad (3)$$

where $\sqrt{A}$ is the lateral extent of the image (roughly the width of the crystal), f is the focal length of the lenses, and AFOV is the angular FOV of the image. In one embodiment, the area of the crystal aperture can be reduced by adjusting the focal length and angular FOV. This in turn reduces the operating power, given that $$P_{cell} \propto \frac{A}{L}.$$

In other embodiments, the operating power can be reduced by increasing the length, L, of the crystal.

In some embodiments, the power consumed by the LIDAR system 100 can be further reduced by using a passive phase bias. In one example, a passive phase bias can be added via a phase plate that adds an amount of phase delay (e.g., a predefined amount) between the orthogonal polarization components of the light. When this phase bias is placed in series with the modulating cell 108, it produces the same phase retardation as if a voltage had been applied to the cell. In this manner, even when zero voltage is applied to the cell, there may be some amount of phase retardation through the system. This allows the intensity modulator 140 to operate in a region of the intensity modulator transfer characteristic where the slope is largest and thus allows the maximum intensity modulation for the smallest change in modulation voltage, making the LIDAR system more power efficient. In some embodiments, the maximum voltage applied may also be reduced to stay in the region of maximum slope.

Figure 9:
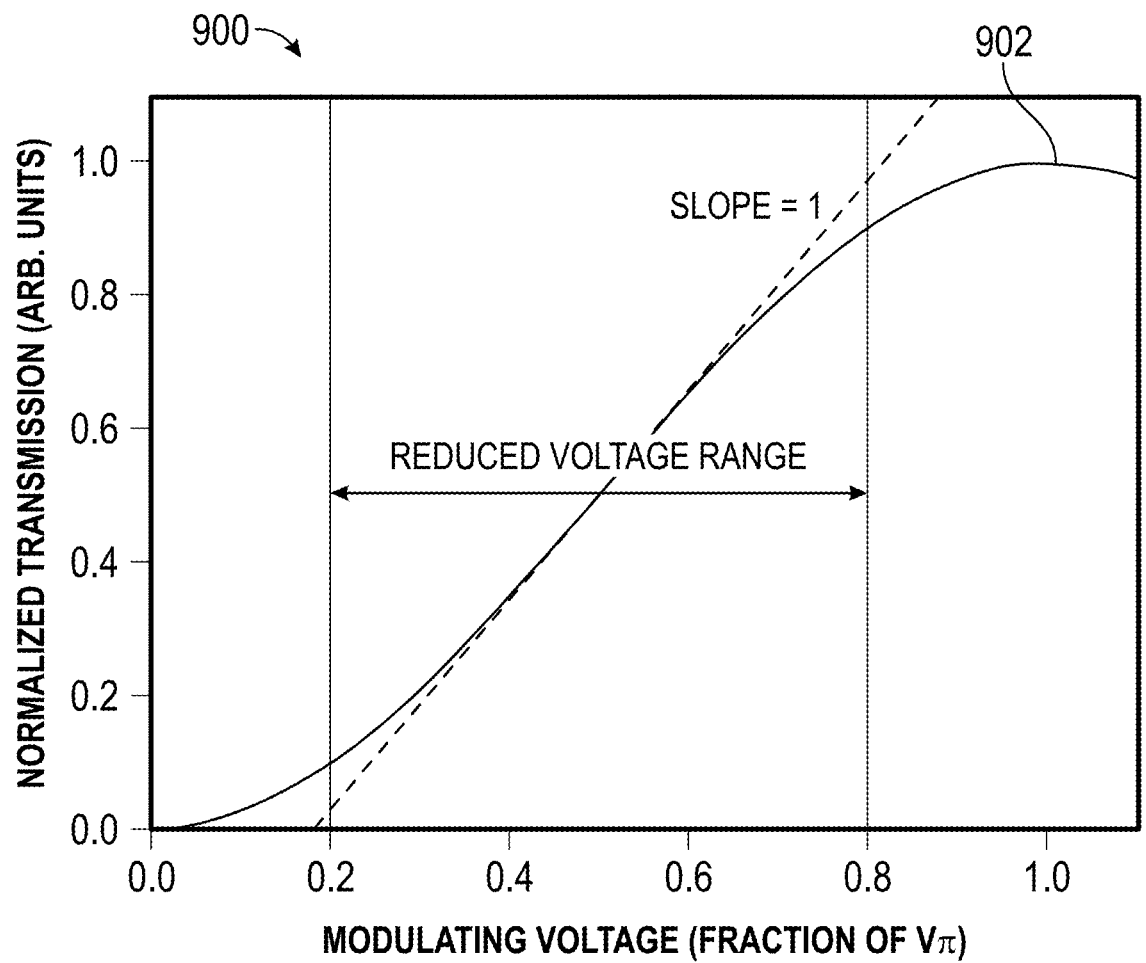
FIG. 9 illustrates an example diagram of a passive phase bias that can be used in a LIDAR system, according to one embodiment.

FIG. 9, for example, illustrates an example diagram 900 of the passive phase bias that can be used in the LIDAR system 100, according to one embodiment. In this embodiment, the LIDAR system 100 may include at least a modulating cell (e.g., modulating cell 108) and a phase plate in series with the modulating cell. The modulating cell can receive a light signal (optical signal) and output a polarized modulated light signal with a first polarization component (e.g., s-polarized light) and a second polarization component (e.g., p-polarized light). The phase plate can be configured to change the polarization state of the light signal by adding a phase delay between the first polarization component of the light signal and the second polarization component of the light signal. The diagram 900, in particular, shows transmission through one output (e.g., one of the two outputs directed to image sensors 114 and 116) of the intensity modulator 140 as a function of modulating voltage (e.g., curve 902). In this example, the passive phase plate creates the same transmission as applying a bias of $V_{applied} \approx 0.2 V_\pi$. The maximum voltage applied may also be reduced to stay within the region of the transmission curve with maximum slope. Using this technique, the maximum applied voltage and power consumption can be reduced by approximately 40% and 64%, respectively.

Figure 10:
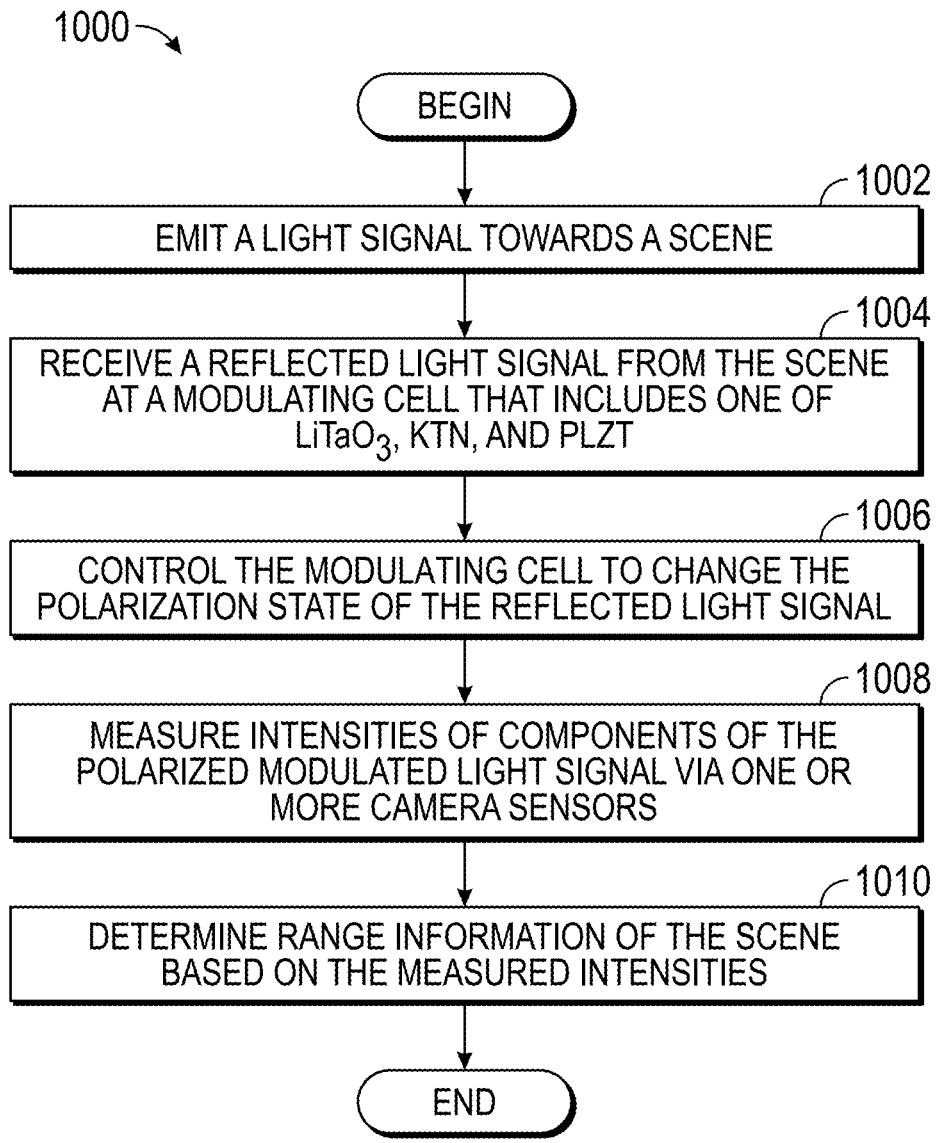
FIG. 10 is a flowchart illustrating a method for determining range information of a scene using a LIDAR system, according to one embodiment.

FIG. 10 is a flowchart illustrating a method 1000 for determining range information of a scene using a LIDAR system (e.g., LIDAR system 100 ), according to one embodiment. The method 1000 may be performed by one or more components of the LIDAR system 100.

The method 1000 begins at block 002, where the LIDAR system emits a light signal (e.g. light pulse emitted from laser source 104) towards a scene (e.g., scene 110). At block 1004, the LIDAR system receives a reflected light signal from the scene at a modulating cell (e.g., modulating cell 108) that includes one of $LiTaO_3$, KTN, and PLZT. Note that $LiTaO_3$, KTN, and PLZT are provided as reference examples of materials that can be used for a modulating cell to provide a large FOV and low operating power. In some embodiments, any active material that (1) has a minimal level of birefringence (e.g., below a threshold amount of birefringence determined according to Equation (1)) or no amount of birefringence in the absence of an electric field applied to the material and (2) exhibits (or possesses) one or more first order EO effects, second order EO effects, higher order EO effects, or a combination thereof, can be used for the modulating cell.

At block 1006, the LIDAR system controls the modulating cell to change the polarization state of the reflected light signal. For example, as the reflected light signal propagates along the length of the modulating cell, the LIDAR system (e.g., using controller 102) may apply a voltage to the modulating cell to cause the modulating cell to change the polarization state of the reflected light signal. At block 1008, the LIDAR system measures intensities of components of the polarized modulated light signal via one or more camera sensors (e.g., camera sensors 114, 116). At block 1010, the LIDAR system determines range information of the scene based on the measured intensities.

Figure 11:
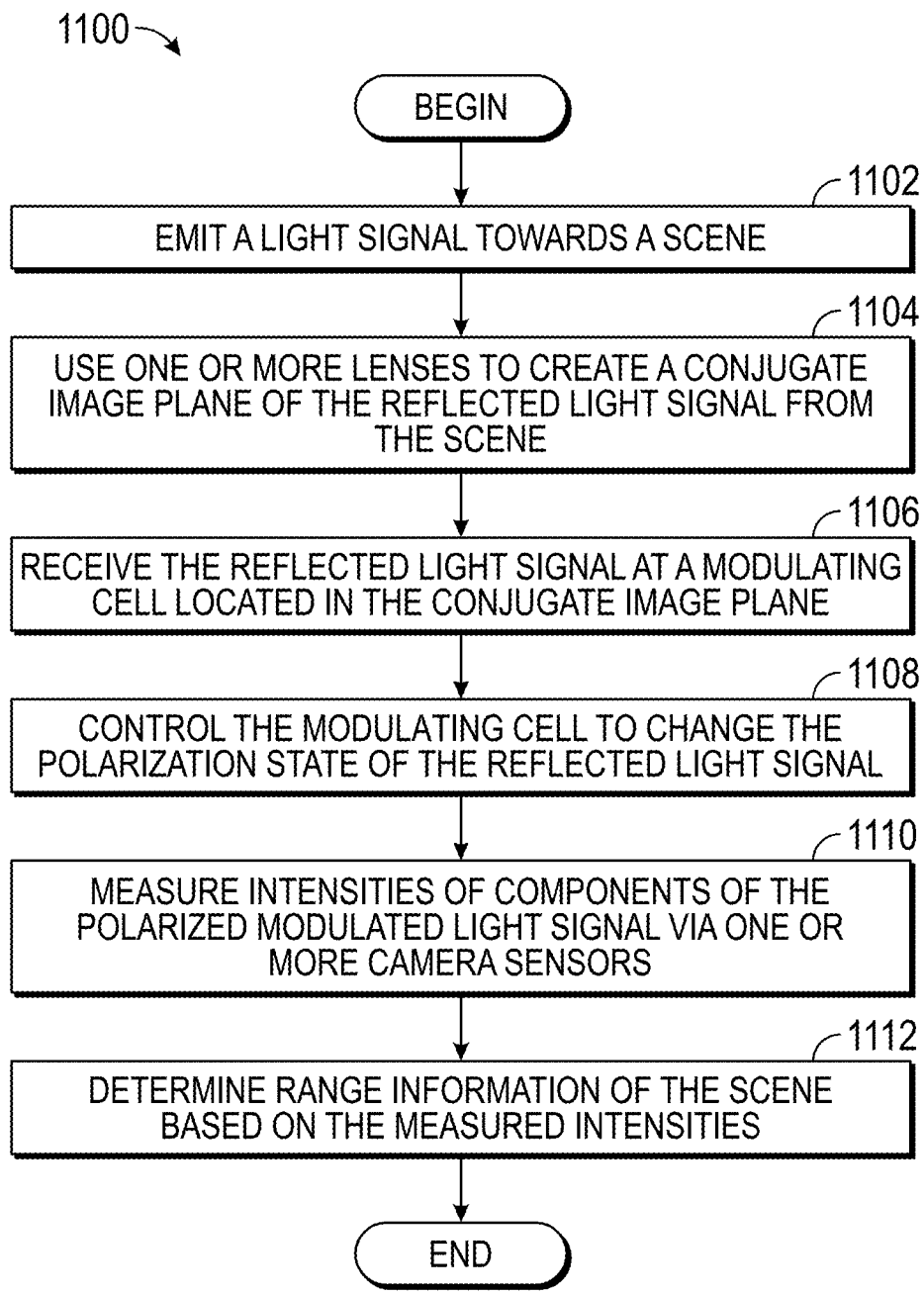
FIG. 11 is a flowchart illustrating another method for determining range information of a scene using a LIDAR system, according to one embodiment.

FIG. 11 is a flowchart illustrating another method 1100 for determining range information of a scene using a LIDAR system (e.g., LIDAR system 100), according to one embodiment. The method 1100 may be performed by one or more components of the LIDAR system 100. In one embodiment, the method 1100 may be used to reduce the operating power of the LIDAR system 100.

The method 1100 begins at block 1102, where the LIDAR system emits a light signal (e.g. light pulse emitted from laser source 104) towards a scene (e.g., scene 110). At block 1104, the LIDAR system uses one or more lenses (e.g., lenses 802 and 804) to create a conjugate image plane of the reflected light signal from the scene.

At block 1106, the LIDAR system receives the reflected light signal at a modulating cell located in the conjugate image plane. For example, in one embodiment, lenses 802 and 804 can be placed on opposite sides of the modulating cell 108 (at a distance close to or at the focal length of the lenses) in order to create a conjugate image in the modulating cell. In one embodiment, the conjugate image may have lateral extent that is reduced, compared to the lateral extent of the rays entering the intensity modulator 810. The reduced lateral extent of the image allows for a smaller crystal and lower electrical power consumption.

At block 1108, the LIDAR system controls the modulating cell to change the polarization state of the reflected light signal. At block 1110, the LIDAR system measures intensities of components of the polarized modulated light signal via one or more camera sensors (e.g., camera sensors 114, 116). At block 1112, the LIDAR system determines range information of the scene based on the measured intensities.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A light detection and ranging (LIDAR) system, comprising:
an intensity modulator configured to receive an optical signal reflected from an object and to perform intensity modulation on the optical signal, the intensity modulator comprising:
a first polarizer configured to receive the optical signal and output a polarized optical signal;
a modulating cell configured to receive the polarized optical signal from the first polarizer and modify a polarization state of the polarized optical signal, wherein the modulating cell comprises lithium tantalate (LiTaO3), potassium tantalate niobate (KTN), or lanthanum-modified lead zirconate titanate (PLZT); and
a second polarizer configured to receive the polarized optical signal with the modified polarization state from the modulating cell and output an intensity modulated optical signal;
a controller configured to apply an electrical signal along an extraordinary axis of the modulating cell to trigger the modulating cell to modify the polarization state of the polarized optical signal; and
one or more camera sensors configured to measure an intensity of the intensity modulated optical signal and determine range information associated with the object based in part on the measured intensity.

2. The LIDAR system of claim 1, wherein the modulating cell comprises LiTaO3.

3. The LIDAR system of claim 1 wherein the extraordinary axis of the modulating cell is oriented transverse to a direction of propagation of the polarized optical signal received by the modulating cell.

4. The LIDAR system of claim 1 wherein the first polarizer is configured to output the polarized optical signal at 45 degrees with respect to the extraordinary axis of the modulating cell and an ordinary axis of the modulating cell.

5. A system, comprising:
a controller; and
a modulating cell comprising a material that (i) has at least one of a first order electro-optic effect and a second order electro-optic effect and (ii) has an amount of birefringence that is less than or equal to a predefined amount of birefringence,
wherein the material comprises a first crystal and a second crystal in series,
wherein the first crystal and the second crystal are oriented such that an extraordinary axis of the second crystal is parallel to an ordinary axis of the first crystal,
wherein the modulating cell is configured to:
receive an optical signal, wherein the optical signal is received by the first crystal prior to the second crystal, and
in response to a bias voltage applied from the controller to the modulating cell,
change a polarization state of the optical signal as the optical signal propagates through the material.

6. The system of claim 5 wherein a length of the first crystal is equal to a length of the second crystal.

7. The system of claim 6, wherein the first crystal is electrically active and the second crystal is electrically inactive.

8. The system of claim 6, wherein the first and second crystals are electrically active.

9. The system of claim 5, wherein the predefined amount of birefringence is zero.

10. The system of claim 5, wherein the first order electro-optic effect comprises a Pockels effect and the second order electro-optic effect comprises a Kerr effect.

11. The system of claim 5, wherein the material comprises one of lithium tantalate (LiTaO3), potassium tantalate niobate (KTN), or lanthanum-modified lead zirconate titanate (PLZT).

12. The system of claim 5, wherein the controller is configured to apply the bias voltage along an extraordinary axis of the material.

13. A system comprising:
a controller; and
a modulating cell comprising a material that (i) has at least one of a first order electro-optic effect and a second order electro-optic effect and (ii) has an amount of birefringence that is less than or equal to a predefined amount of birefringence,
wherein the material comprises potassium tantalate niobate (KTN),
wherein the modulating cell is configured to at least:
receive an optical signal; and
in response to a bias voltage applied from the controller to the modulating cell,
change a polarization state of the optical signal as the optical signal propagates through the material,
wherein the modulating cell is configured to operate at a temperature that is above a Curie temperature.

14. The system of claim 13, wherein the Curie temperature is modified during fabrication of the material.

15. A light detection and ranging (LIDAR) system, comprising:
a modulating cell configured to receive an optical signal;
a first optical lens disposed on a first side of the modulating cell in a direction of propagation of the optical signal; and
a second optical lens disposed on an opposite second side of the modulating cell in the direction of propagation of the optical signal, wherein:
the first optical lens and the second optical lens are configured to form a conjugate image of the optical signal in a conjugate image plane; and
the modulating cell is configured to receive the conjugate image of the optical signal in the conjugate image plane.

16. The LIDAR system of claim 15, wherein the first optical lens is located on the first side of the modulating cell at a distance equal to a focal length of the first optical lens, and
wherein the second optical lens is located on the second side of the modulating cell at a distance equal to a focal length of the second optical lens.

17. The LIDAR system of claim 15, further comprising:
a linear polarizer; and
a quarter waveplate, wherein the first optical lens is disposed between the modulating cell and the linear polarizer, and wherein the second optical lens is disposed between the modulating cell and the quarter waveplate.

18. The LIDAR system of claim 15, wherein the modulating cell comprises a material that (i) has a second order electro-optic effect and (ii) has a zero amount of birefringence.

19. The LIDAR system of claim 18, wherein the material comprises potassium tantalate niobate (KTN) or lanthanum-modified lead zirconate titanate (PLZT).

20. A light detection and ranging (LIDAR) system, comprising:
a modulating cell configured to receive an optical signal and output a polarized modulated optical signal with a first polarization component and a second polarization component, wherein the modulating cell comprises a material that (i) has a second order electro-optic effect and (ii) has a zero amount of birefringence, and wherein the modulating cell is configured to operate at a temperature that is above a Curie temperature; and
a phase plate disposed in series with the modulating cell and configured to change a polarization state of the optical signal, wherein the phase plate is configured to change the polarization state of the optical signal by adding a phase delay between the first polarization component of the optical signal.

21. The light detection and ranging (LIDAR) system of claim 20, wherein the material comprises a first crystal and a second crystal in series, and
wherein the first crystal is electrically active and the second crystal is electrically inactive.

* * * * *